(12) United States Patent
Ferre et al.

(10) Patent No.: US 8,863,372 B1
(45) Date of Patent: Oct. 21, 2014

(54) HARD DISK DRIVE TOP COVER REMOVAL

(75) Inventors: Andres G. Ferre, Petaling Jaya (MY); Sie Cheang Phuah, Subang Jaya (MY); Lie Dhani Hastama, Petaling Jaya (MY); Mooi Hoon Lim, Kuala Lumpur (MY)

(73) Assignee: Western Digital Technologies, Inc., Irvine, CA (US)

( * ) Notice: Subject to any disclaimer, the term of this patent is extended or adjusted under 35 U.S.C. 154(b) by 527 days.

(21) Appl. No.: 13/207,295

(22) Filed: Aug. 10, 2011

Related U.S. Application Data

(60) Provisional application No. 61/388,526, filed on Sep. 30, 2010.

(51) Int. Cl.
*B23P 19/06* (2006.01)
*G11B 25/04* (2006.01)

(52) U.S. Cl.
CPC ............... *G11B 25/043* (2013.01); *B23P 19/06* (2013.01)
USPC ............................... 29/737; 29/426.5; 29/762

(58) Field of Classification Search
CPC .... B23P 19/069; B23P 19/067; G11B 25/043
USPC ........................................ 29/737, 762, 426.5
See application file for complete search history.

(56) References Cited

U.S. PATENT DOCUMENTS

| | | |
|---|---|---|
| 6,886,234 B2 | 5/2005 | Nayar et al. |
| 2002/0129489 A1* | 9/2002 | Jenkins et al. ............. 29/603.03 |
| 2009/0158574 A1 | 6/2009 | Fawzi et al. |
| 2009/0260209 A1* | 10/2009 | Ishibashi et al. ........... 29/407.02 |

* cited by examiner

*Primary Examiner* — Livius R Cazan

(57) ABSTRACT

A hard disk drive (HDD) top cover removal tool includes a nest assembly, a clamp, a guide plate, and a purge and vacuum assembly (PAVA). The nest assembly secures an HDD and rotates it from a first to a second position. The clamp presses against a top cover of the HDD such that the top cover maintains contact with a hard drive body of the HDD. A hole defined in the guide plate is aligned with a screw location of the top cover and the hard drive body, and receives a screw driver for removing a screw fastening the top cover to the hard drive body. The PAVA purges and evacuates particles from the screw location of the top cover and the hard drive body of the HDD in the second position. The clamp releases the top cover. The PAVA removes the released top cover from the hard drive body.

12 Claims, 13 Drawing Sheets

Start     200

▼ secure a hard disk drive in a nest assembly
S202

▼ press a clamp coupled to the nest assembly against a top cover of the secured hard disk drive such that the top cover maintains contact with a hard drive body of the hard disk drive
S204

▼ remove a screw fastening the top cover to the hard drive body at a screw location of the top cover and the hard drive body
S206

▼ rotate the secured hard disk drive from a first position to a second position
S208

▼ purge and evacuate, with a purge and vacuum assembly, particles from the screw location of the pressed top cover and the hard drive body of the hard disk drive in the second position
S210

▼ release the top cover
S212

▼ remove, with the purge and vacuum assembly, the released top cover from the hard drive body
S214

▼

End

FIG. 2

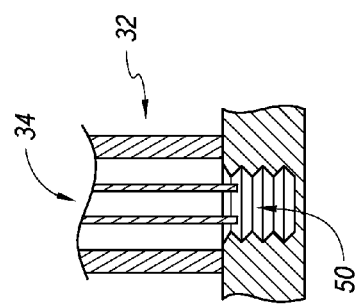
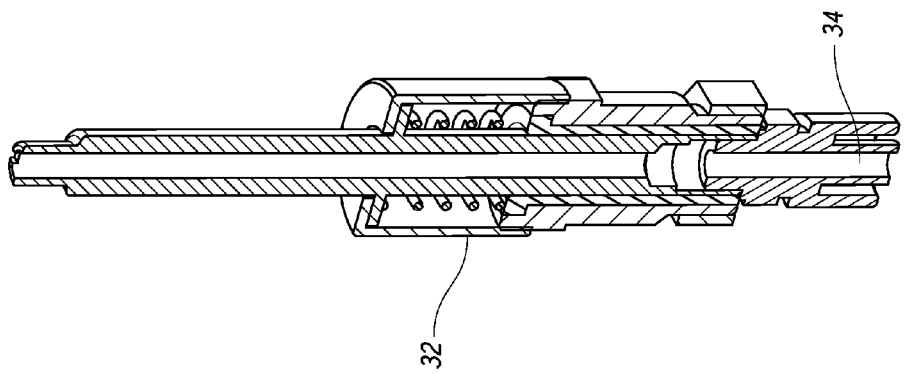

HARD DISK DRIVE TOP COVER REMOVAL

CROSS-REFERENCE TO RELATED APPLICATIONS

The present application claims priority from provisional U.S. Patent Application Ser. No. 61/388,526, filed on Sep. 30, 2010, the specification of which is incorporated herein by reference.

FIELD OF THE INVENTION

The present invention generally relates to manufacturing and assembly equipment and, in particular, relates to hard disk drive top cover removal.

BACKGROUND

A top cover may be removed from a hard disk drive in order to repair or replace parts contained in the hard disk drive. Removing the top cover may entail removal of screws fastening the top cover to a hard drive body of the hard disk drive prior to removal of the top cover. However, screw removal may contaminate the hard disk drive because particles may be generated as a result of abrasive contact between the screws and a screw driver used to remove the screws. These particles may be displaced onto the media of the hard disk drive during the screw removal and top cover removal process, causing contamination of the hard disk drive. It is therefore advantageous to minimize the amount of particles that may contaminate the hard disk drive during the top cover removal process.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIG. 2 illustrates a method for removing a top cover of a hard disk drive, in accordance with various aspects of the subject technology.

FIGS. 9A and 9B illustrate cross-sectional views of a vacuum tube, in accordance with various aspects of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In certain instances, well-known structures and techniques have not been shown in detail so as not to obscure the subject technology.

Figure 1:
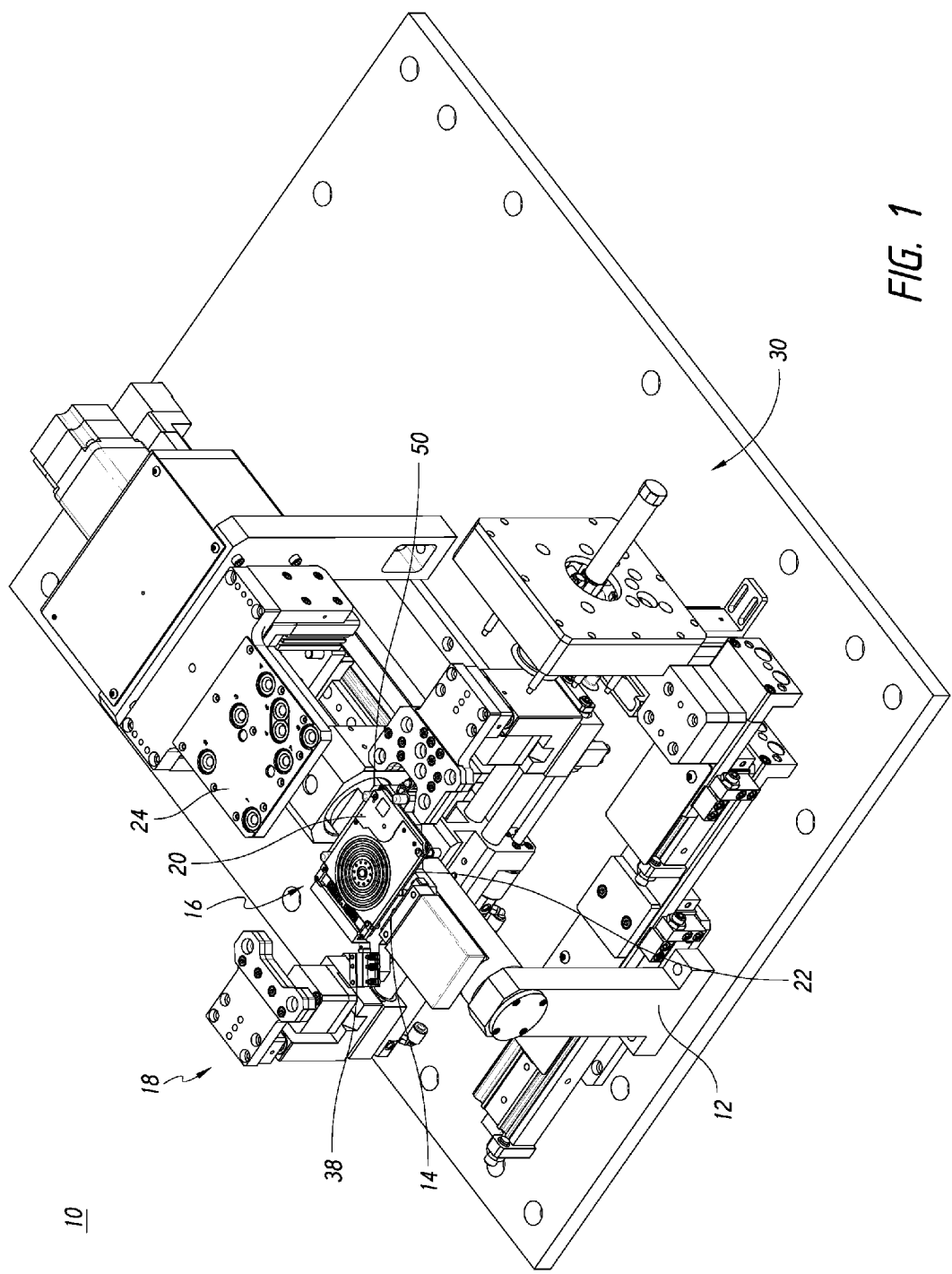
FIG. 1 illustrates a perspective view of a hard disk drive top cover removal tool, in accordance with various aspects of the subject technology.

FIG. 1 illustrates a perspective view of hard disk drive top cover removal tool 10, in accordance with various aspects of the subject technology. Hard disk drive top cover removal tool 10 may be used to remove top cover 20 of hard disk drive 16 from hard drive body 22 and to minimize the amount of particles that may contaminate hard disk drive 16 during removal of top cover 20. In some aspects, hard disk drive top cover removal tool 10 comprises main body 12, nest assembly 14 rotatably attached to main body 12, clamp 18 coupled to nest assembly 14, guide plate 24, and purge and vacuum assembly 30.

FIG. 2 illustrates method 200 for removing top cover 20 of hard disk drive 16, in accordance with various aspects of the subject technology. In an initialization step at the "Start" of method 200, nest assembly 14 is exposed to allow hard disk drive 16 to be secured in nest assembly 14. According to step S202 of method 200, hard disk drive 16 is secured in nest assembly 14, as shown in FIG. 1. In some aspects, nest assembly 14 comprises datum feature 38 that engages hard disk drive 16 for positioning hard disk drive 16 in nest assembly 14.

Figure 3:
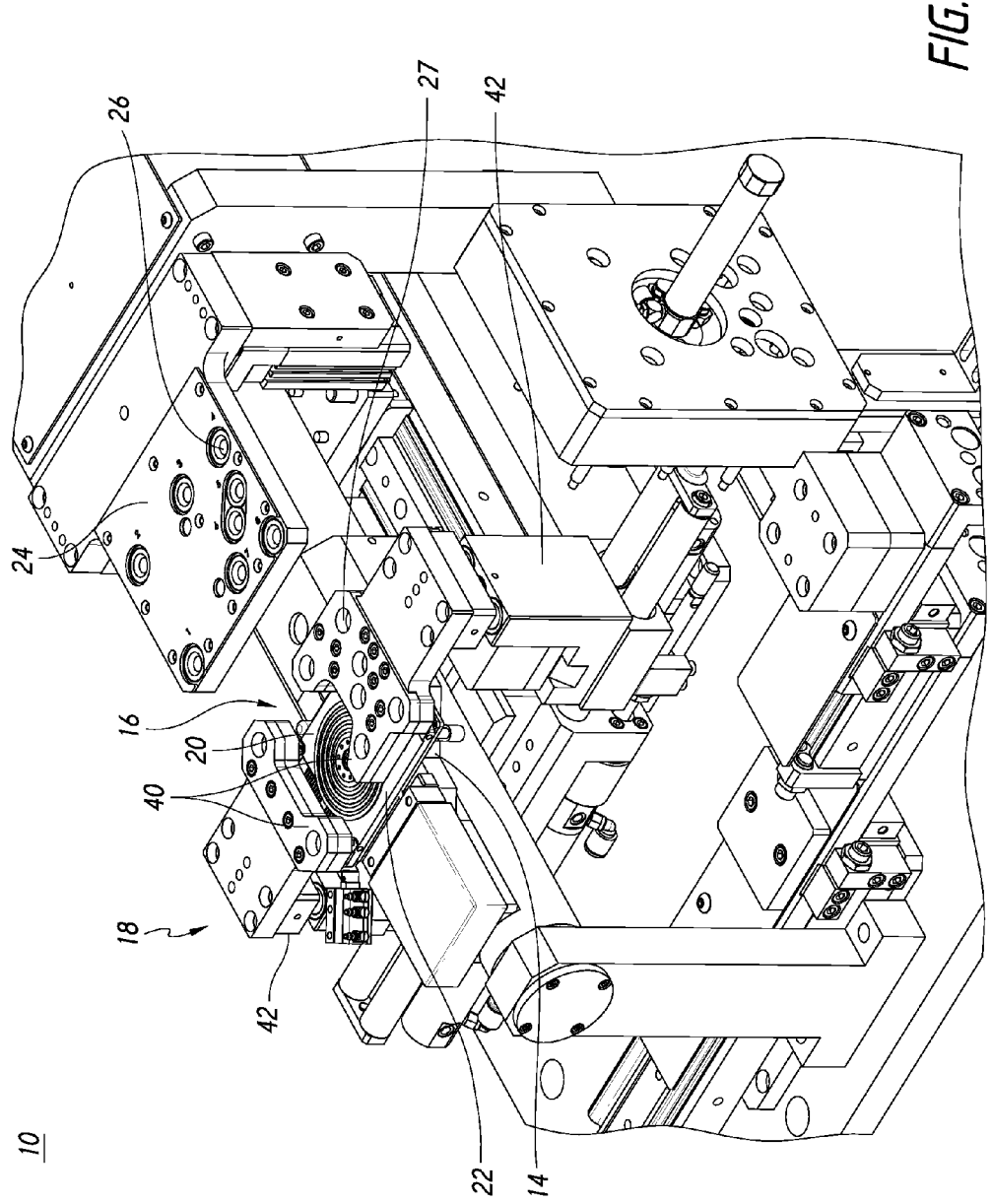
FIG. 3 illustrates a perspective view of a hard disk drive top cover removal tool in which a clamp is pressed against a top cover, in accordance with various aspects of the subject technology.

After hard disk drive 16 is secured in nest assembly 14, clamp 18 is pressed against top cover 20 such that top cover 20 maintains contact with hard drive body 22, according to step S204. For example, FIG. 3 illustrates a perspective view of hard disk drive top cover removal tool 10 in which clamp 18 is pressed against top cover 20, in accordance with various aspects of the subject technology. Clamp 18 comprises clamp body 42 coupled to nest assembly 14. Clamp 18 also comprises one or more brackets 40 attached to clamp body 42 and is configured to press against top cover 20. Clamp 18 also comprises an actuator (not shown) coupled to brackets 40. In some aspects, the actuator is configured to move brackets 40 from a non-engaging configuration to an engaging configuration and vice versa. In some aspects, brackets 40 are not engaged with top cover 20 in the non-engaging configuration. In some aspects, brackets 40 press against top cover 20 in the engaging configuration, as shown in FIG. 3.

Figure 4B:
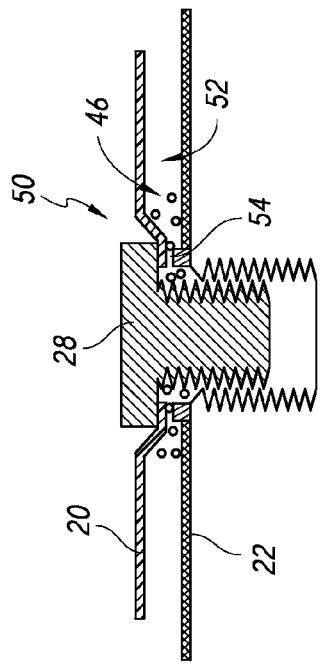
FIG. 4B illustrates a cross-sectional view of a screw as the screw is removed from a hard drive body.
Figure 4A:
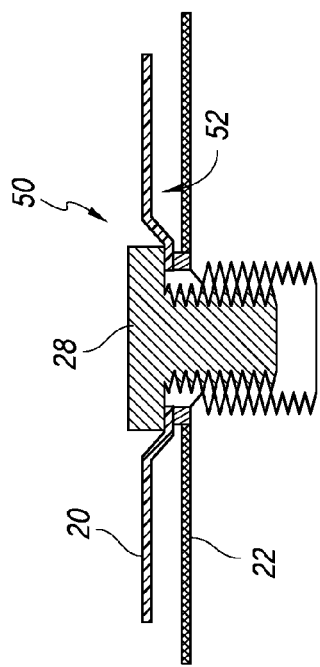
FIG. 4A illustrates a cross-sectional view of a screw used to fasten a top cover to a hard drive body.

According to various aspects of the subject technology, it is advantageous to press clamp 18 against top cover 20 such that top cover 20 maintains contact with hard drive body 22. Doing so may ensure that particles generated as a result of removing a screw fastening top cover 20 to hard drive body 22 at screw location 50 (e.g., shown in FIG. 1 and located beneath hole 27 defined in bracket 40 in FIG. 3) do not become displaced into an interior of hard disk drive 16, which may contaminate the media of hard disk drive 16. For example, FIGS. 4A and 4B illustrate a scenario in which clamp 18 is not pressed against top cover 20 as screw 28, which fastens top cover 20 to hard drive body 22, is removed. FIG. 4A illustrates a cross-sectional view of screw 28 used to fasten top cover 20 to hard drive body 22. FIG. 4B illustrates a cross-sectional view of screw 28 as screw 28 is removed. As shown in FIG. 4B, top cover 20 may deflect away from hard drive body 22 as screw 28 is removed such that gap 54 between top cover 20 and hard drive body 22 is created. Thus, interior 52 of hard disk drive 16 is exposed to particles 46 generated as a result of abrasive contact between screw 28 and a screw driver used to remove screw 28. Particles 46 may be displaced onto the media of hard disk drive 16 and cause contamination.

Figure 4D:
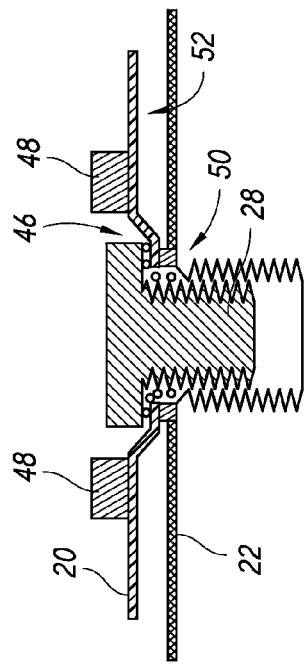
FIG. 4D illustrates a cross-sectional view of a screw as the screw is removed from a hard drive body with pressure applied to the top cover, in accordance with various aspects of the subject technology.
Figure 4C:
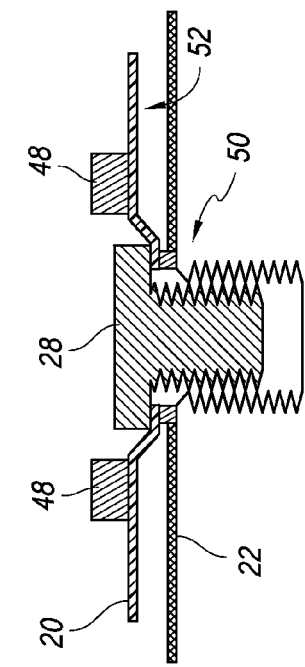
FIG. 4C illustrates a cross-sectional view of a screw used to fasten a top cover to a hard drive body with pressure applied to the top cover, in accordance with various aspects of the subject technology.

In contrast, FIGS. 4C and 4D illustrate a scenario in which clamp 18 is pressed against top cover 20 as screw 28 is removed, in accordance with various aspects of the subject technology. Pressure 48 represents the pressure that clamp 18 applies against top cover 20. As screw 28 is removed, top cover 20 maintains contact with hard drive body 22 because of pressure 48 being applied against top cover 20. Thus, particles 46 generated as a result of abrasive contact between screw 28 and the screw driver during the screw removal process are not displaced into interior 52 of hard disk drive 16, as shown in FIG. 4D.

Figure 5:
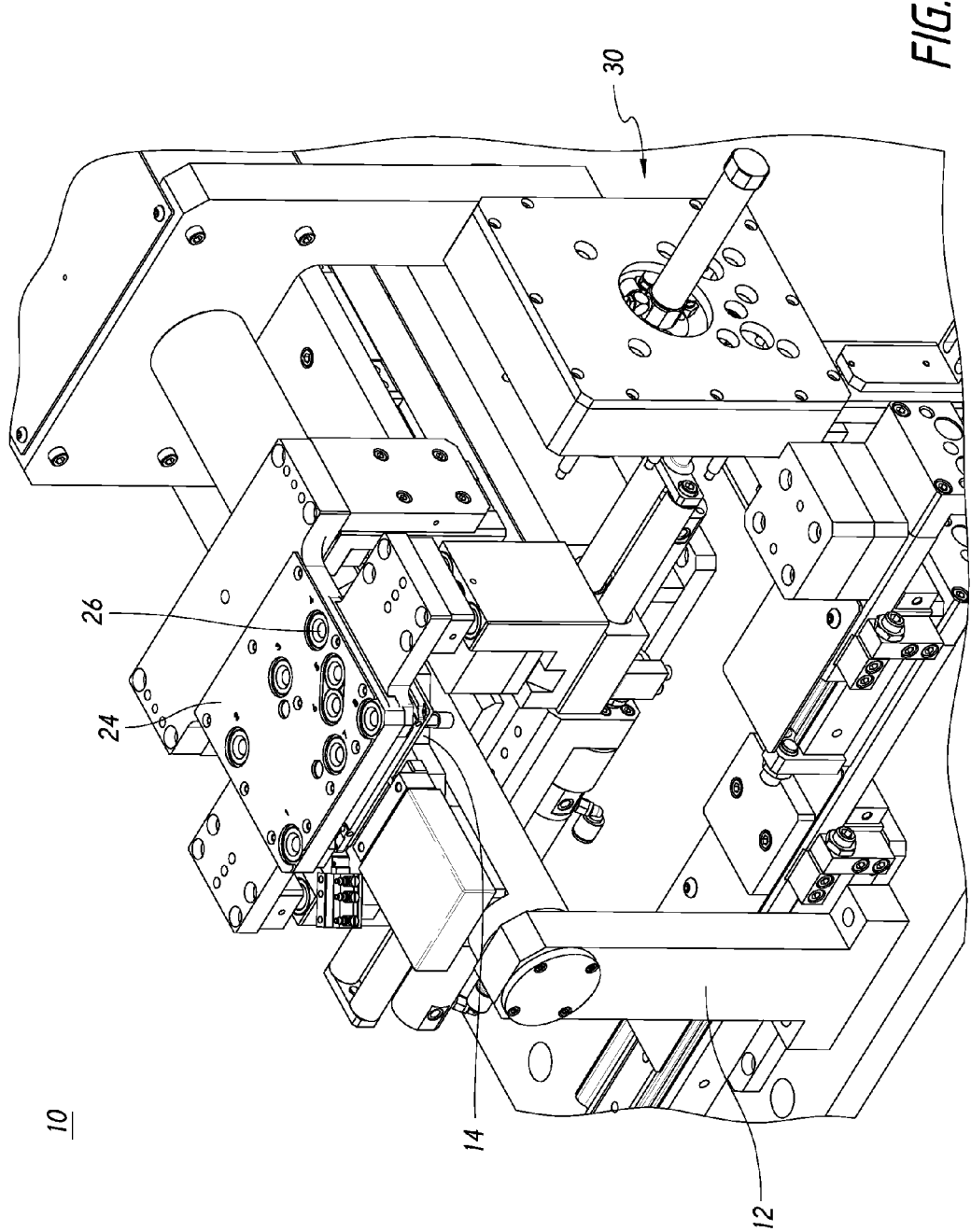
FIG. 5 illustrates a perspective view of a hard disk drive top cover removal tool in which a guide plate is positioned over a top cover, in accordance with various aspects of the subject technology.

After clamp 18 is pressed against top cover 20, screw 28 may be removed, according to step S206 of FIG. 2. In some aspects, guide plate 24 is used to facilitate removal of screw 28. FIG. 5 illustrates a perspective view of hard disk drive top cover removal tool 10 in which guide plate 24 is positioned over top cover 20, in accordance with various aspects of the subject technology. Guide plate 24 is slidably mounted on main body 12 and is configured to slide toward nest assembly 14 and be positioned with respect to top cover 20 such that hole 26 defined in guide plate 24 is aligned with both hole 27 of bracket 40 and screw location 50. Thus, hole 26 and hole 27 are configured to receive the screw driver used for removing screw 28. In some aspects a bushing of a non-metallic material may be inserted into hole 26 so that the screw driver does not directly contact guide plate 24, thereby avoiding abrasive metal-to-metal contact between guide plate 24 and the screw driver. In some aspects, a bushing may also be inserted into hole 27. In some aspects, bracket 40 may be shaped such that bracket 40 does not cover screw location 50 when bracket 40 is pressed against top cover 20. In such a scenario, hole 26 of guide plate may be aligned directly with screw location 50 so that hole 26 may receive the screw driver for removing screw 28. In some aspects, hard disk drive top cover removal tool 10 comprises the screw driver.

Figure 6:
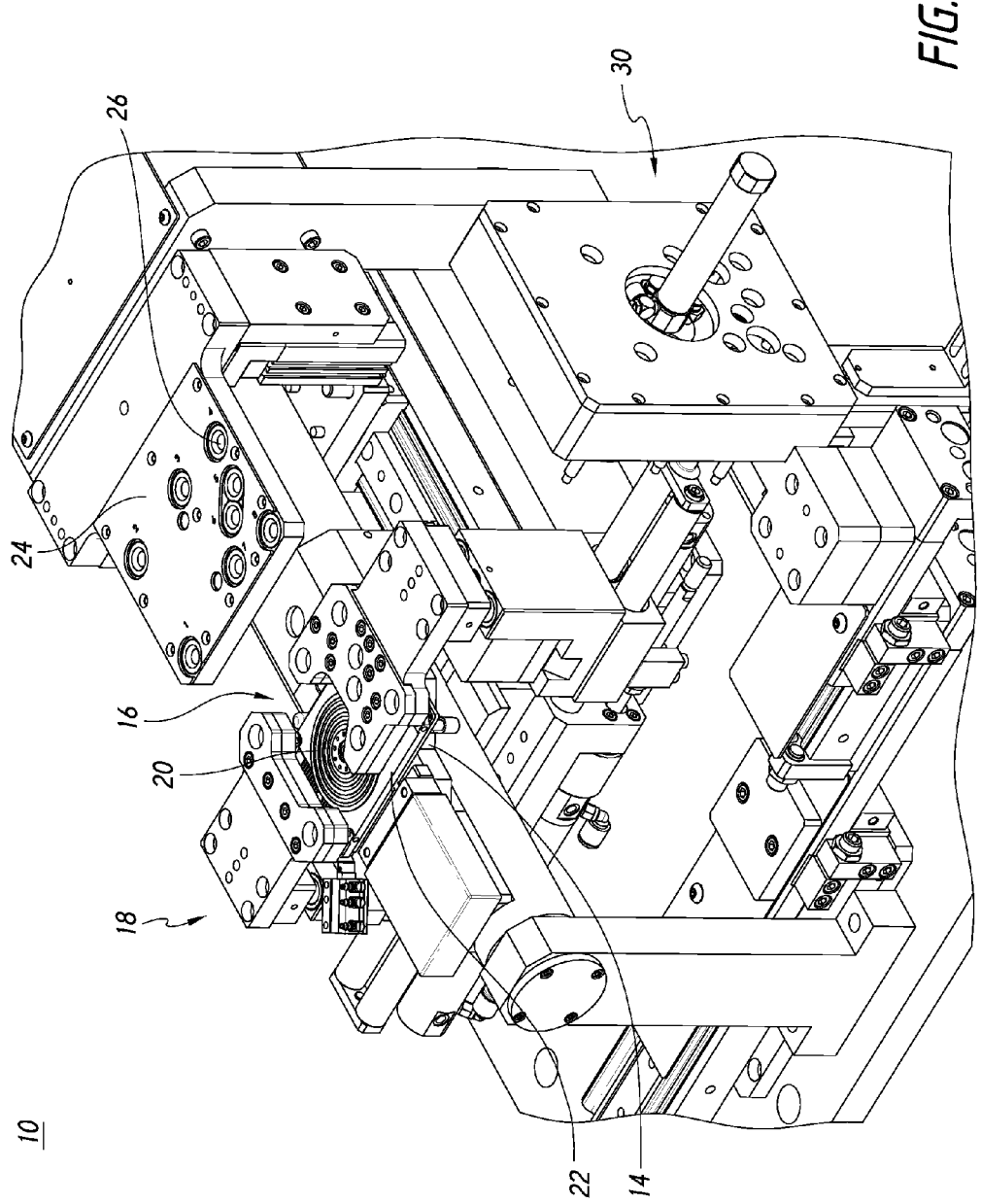
FIG. 6 illustrates a perspective view of a hard disk drive top cover removal tool in which a guide plate is no longer positioned over a top cover, in accordance with various aspects of the subject technology.

After screw 28 is removed, guide plate 24 may slide away from nest assembly 14. FIG. 6 illustrates a perspective view of hard disk drive top cover removal tool 10 in which guide plate 24 is no longer positioned over top cover 20, in accordance with various aspects of the subject technology.

Figure 7:
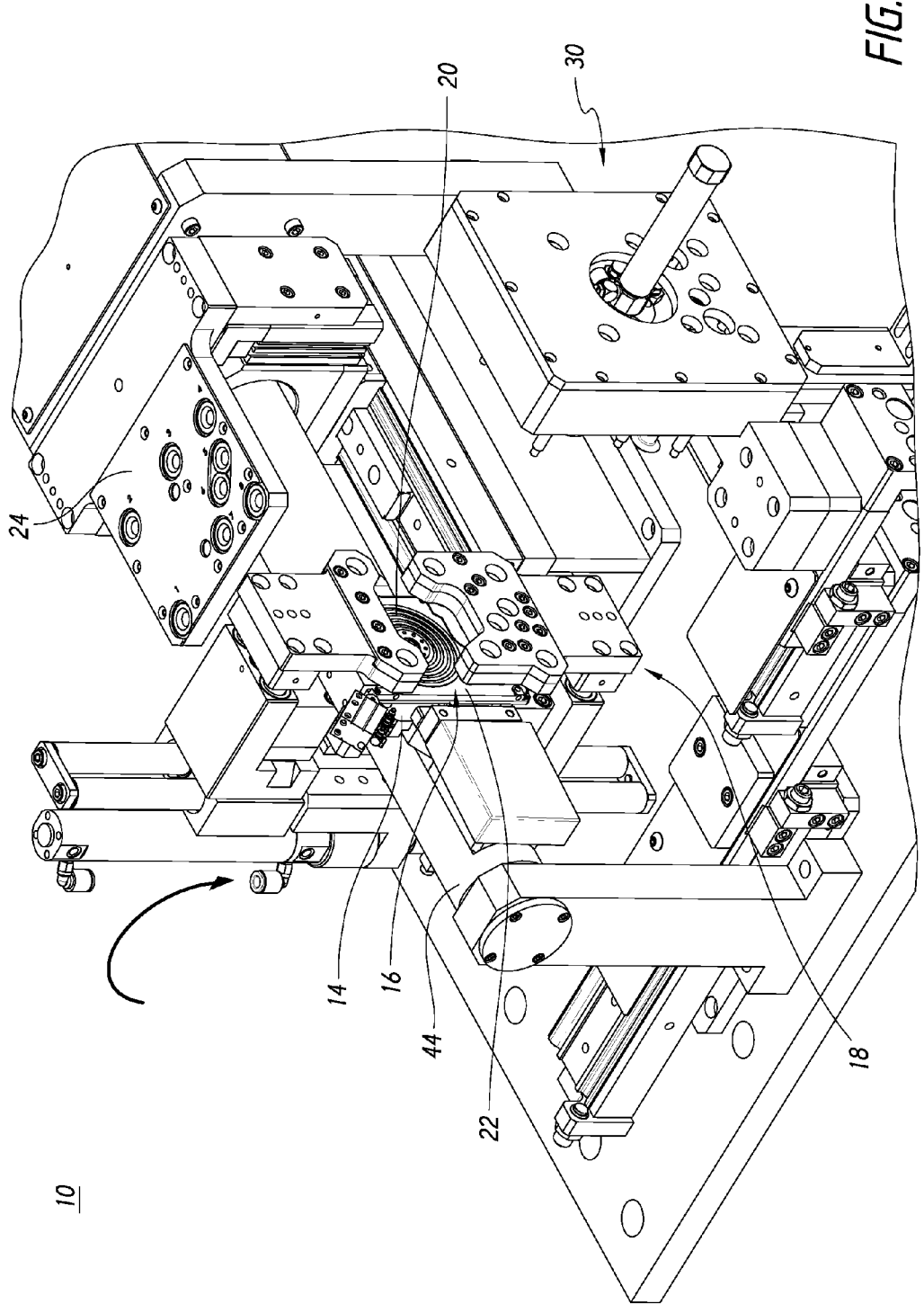
FIG. 7 illustrates a perspective view of a hard disk drive top cover removal tool in which a nest assembly rotates a hard disk drive from a first position to a second position, in accordance with various aspects of the subject technology.

After guide plate 24 is no longer positioned over top cover 20, nest assembly 14 may rotate hard disk drive 16 to various positions to reduce the likelihood that particles 46 are displaced into interior 52 of hard disk drive 16. For example, nest assembly 14 may rotate hard disk drive 16 from a first position to a second position, according to step S208 of FIG. 2. Hard disk drive 16 is in the first position as shown in FIG. 6. In this case, hard disk drive 16 is in an upward facing position. FIG. 7 illustrates a perspective view of hard disk drive top cover removal tool 10 in which nest assembly 14 rotates hard disk drive 16 to the second position, in accordance with various aspects of the subject technology. In some aspects, the second position is perpendicular to the first position. Thus, as shown in FIG. 7, hard disk drive 16 is in a sideways facing position. By rotating hard disk drive 16 to the sideways facing position, the likelihood of particles 46 being displaced into interior 52 is reduced because particles 46 will tend to be displaced toward the ground due to the force of gravity rather than being displaced toward interior 52. In some aspects, nest assembly 14 may be configured to rotate hard disk drive 16 up to 90 degrees from the first position to the second position, or even greater than 90 degrees provided that doing so may reduce the likelihood that particles 46 are displaced into interior 52. In some aspects, screw 28 may be removed after hard disk drive 16 has been rotated to the second position.

According to various aspects of the subject technology, main body 12 comprises shaft 44. Nest assembly 14 is mounted on shaft 44. A motor (not shown) is configured to rotate shaft 44 to rotate hard disk drive 16 secured in nest assembly 14 from the first position to the second position.

After hard disk drive 16 is rotated to the second position, purge and vacuum assembly 30 may be used to purge and evacuate particles 46 from screw location 50, according to step S210 of FIG. 2.

Figure 8A:
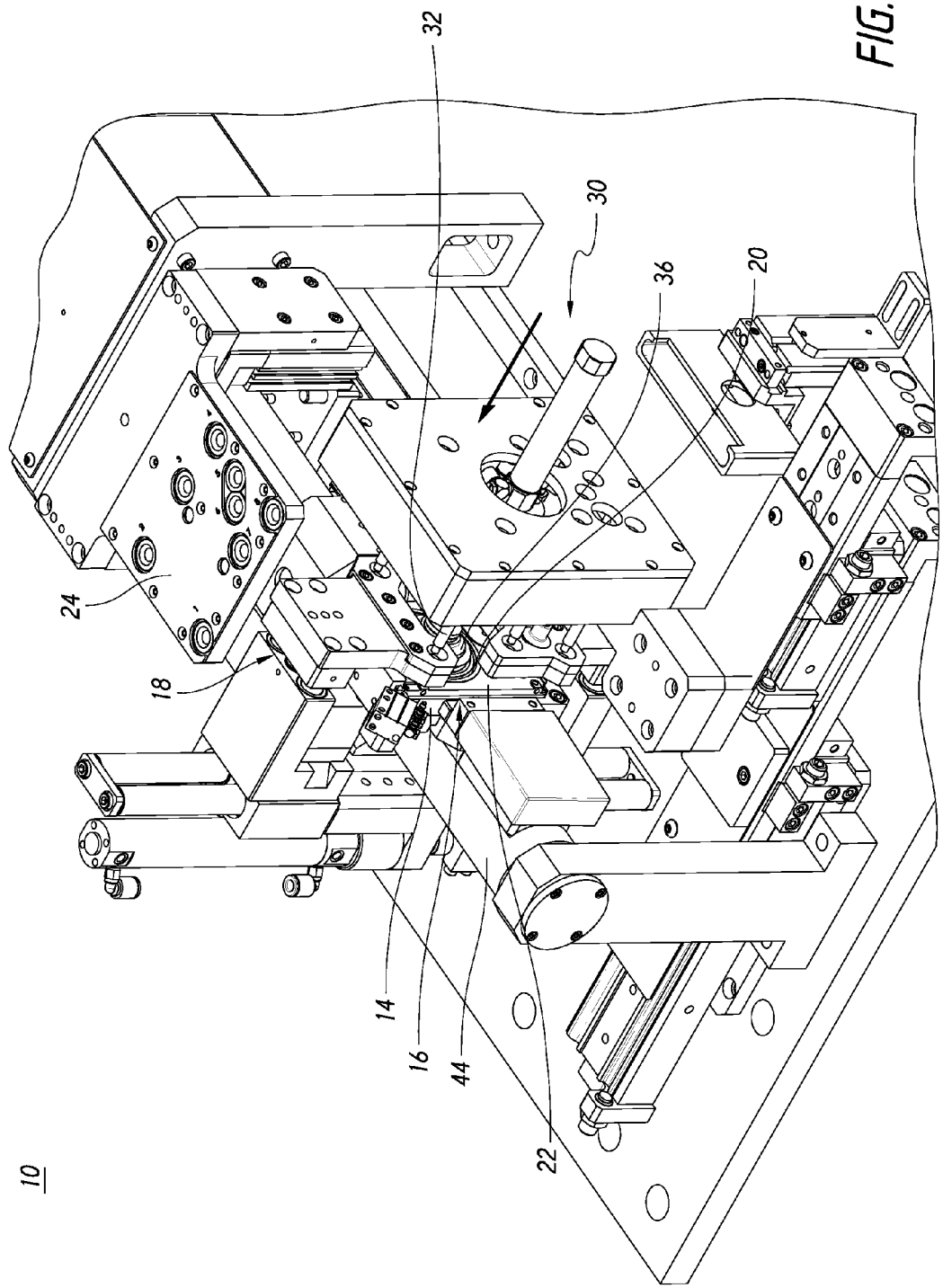
FIG. 8A illustrates a perspective view of a hard disk drive top cover removal tool in which a purge and vacuum assembly engages a top cover to purge and evacuate particles, in accordance with various aspects of the subject technology.
Figure 8B:
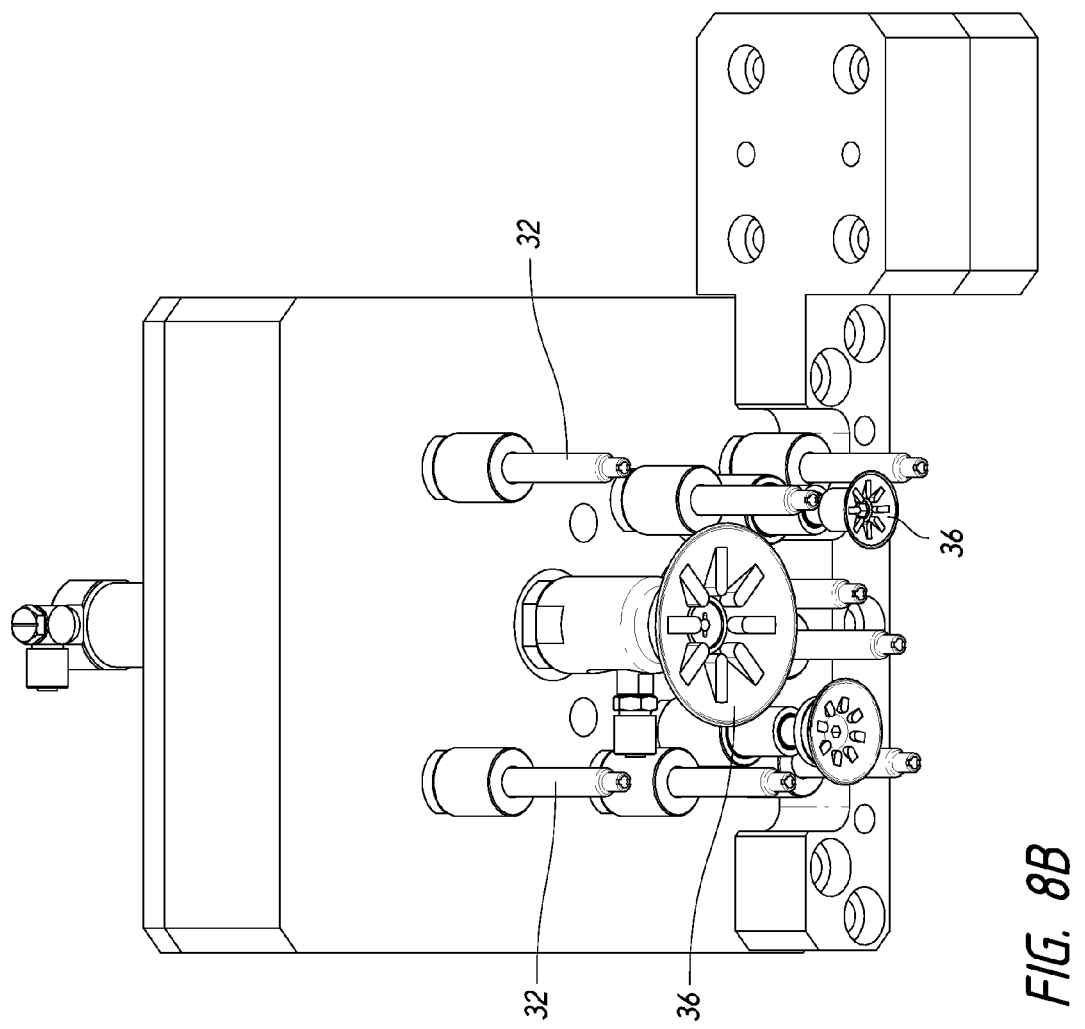
FIG. 8B illustrates a top cover engaging side of a purge and vacuum assembly, in accordance with various aspects of the subject technology.

FIG. 8A illustrates a perspective view of hard disk drive top cover removal tool 10 in which purge and vacuum assembly 10 engages top cover 20 to purge and evacuate particles 46, in accordance with various aspects of the subject technology. In some aspects, purge and vacuum assembly 30 is slidably mounted on main body 12. Purge and vacuum assembly 30 is configured to slide toward nest assembly 14 to engage top cover 20, as shown in FIG. 8A. FIG. 8B illustrates a top cover 20 engaging side of purge and vacuum assembly 30, in accordance with various aspects of the subject technology. Purge and vacuum assembly 30 comprises one or more grippers 36 configured to grip top cover 20. For example, each gripper 36 comprises a suction cup configured to apply suction to top cover 20 for gripping top cover 20 when purge and vacuum assembly engages top cover 20. According to certain aspects, purge and vacuum assembly also comprises one or more vacuum tubes 32 used to purge and evacuate particles 46 when purge and vacuum assembly 30 engages top cover 20.

FIGS. 9A and 9B illustrate cross-sectional views of vacuum tube 32, in accordance with various aspects of the subject technology. Vacuum tube 32 is configured to encapsulate screw location 50 when purge and vacuum assembly 30 engages top cover 20. Purge and vacuum assembly 30 further comprises air purge nozzle 34 extending into vacuum tube 32. In some aspects, purge and vacuum assembly 30 is configured to dislodge particles 46 when pulses of compressed gas are applied to screw location 50 by a compressed gas source (not shown) via air purge nozzle 34 and to evacuate particles 46 from vacuum tube 32 when a vacuum is applied to vacuum tube 32 by a vacuum source (not shown). Although purge and vacuum assembly 30 is shown as purging and evacuating particles 46 after hard disk drive 16 is rotated to the second position, purge and vacuum assembly 30 may also engage top cover 20 and purge and evacuate particles 46 before hard disk drive 16 is rotated to the second position.

Figure 10:
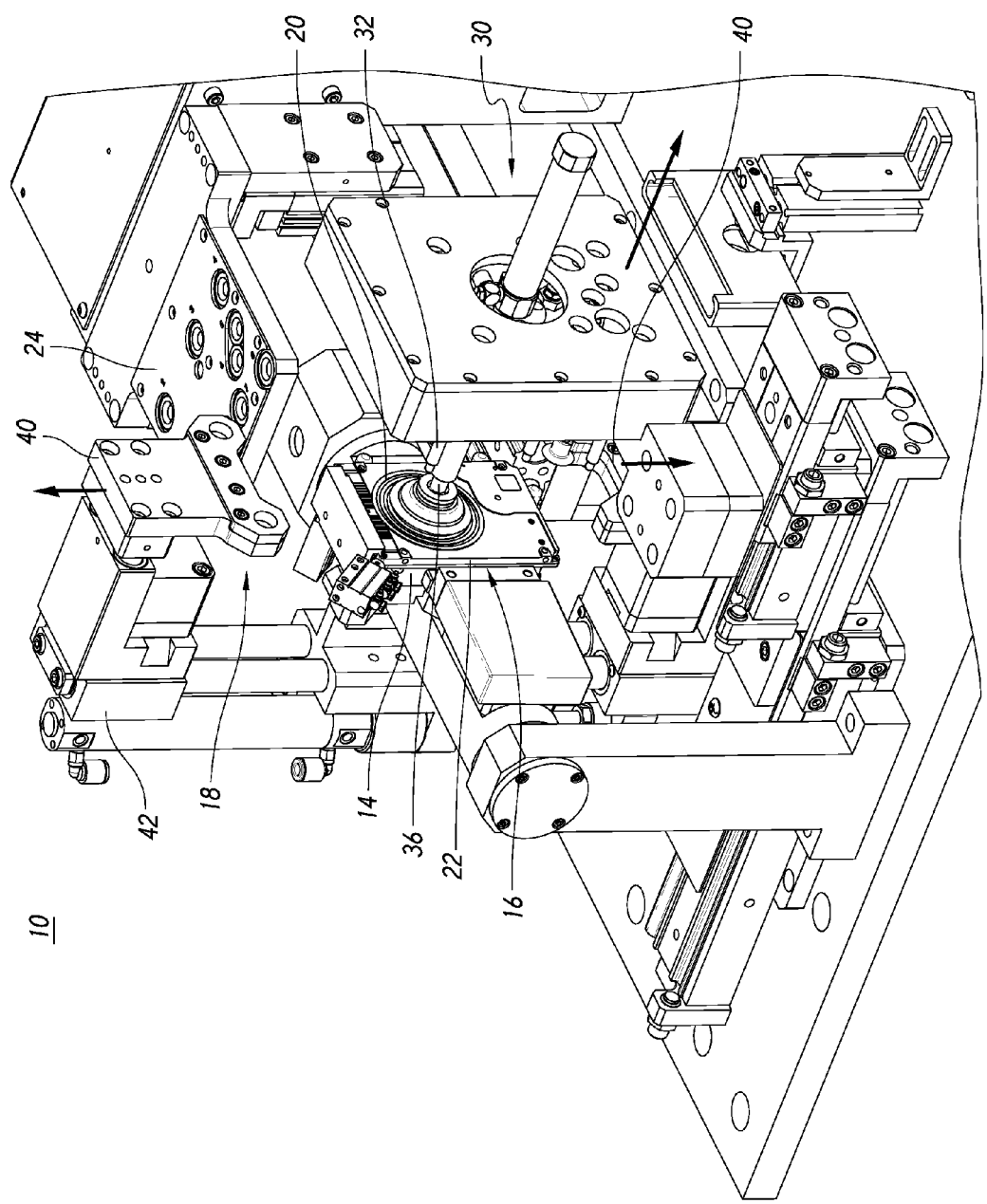
FIG. 10 illustrates a perspective view of a hard disk drive top cover removal tool in which a clamp releases a top cover, in accordance with various aspects of the subject technology.

After particles 46 are purged and evacuated, top cover 20 is released, according to step S212 of FIG. 2. FIG. 10 illustrates a perspective view of hard disk drive top cover removal tool 10 in which clamp 18 releases top cover 20, in accordance with various aspects of the subject technology. In some aspects, the actuator coupled to brackets 40 is configured to move each bracket 40 from the engaging configuration to the non-engaging configuration, as shown in FIG. 10, when hard disk drive 16 is in the second position for releasing top cover 20. In some aspects, purge and vacuum assembly 30 may purge and evacuate particles 46 at the same time and/or after top cover 20 is released.

Figure 11:
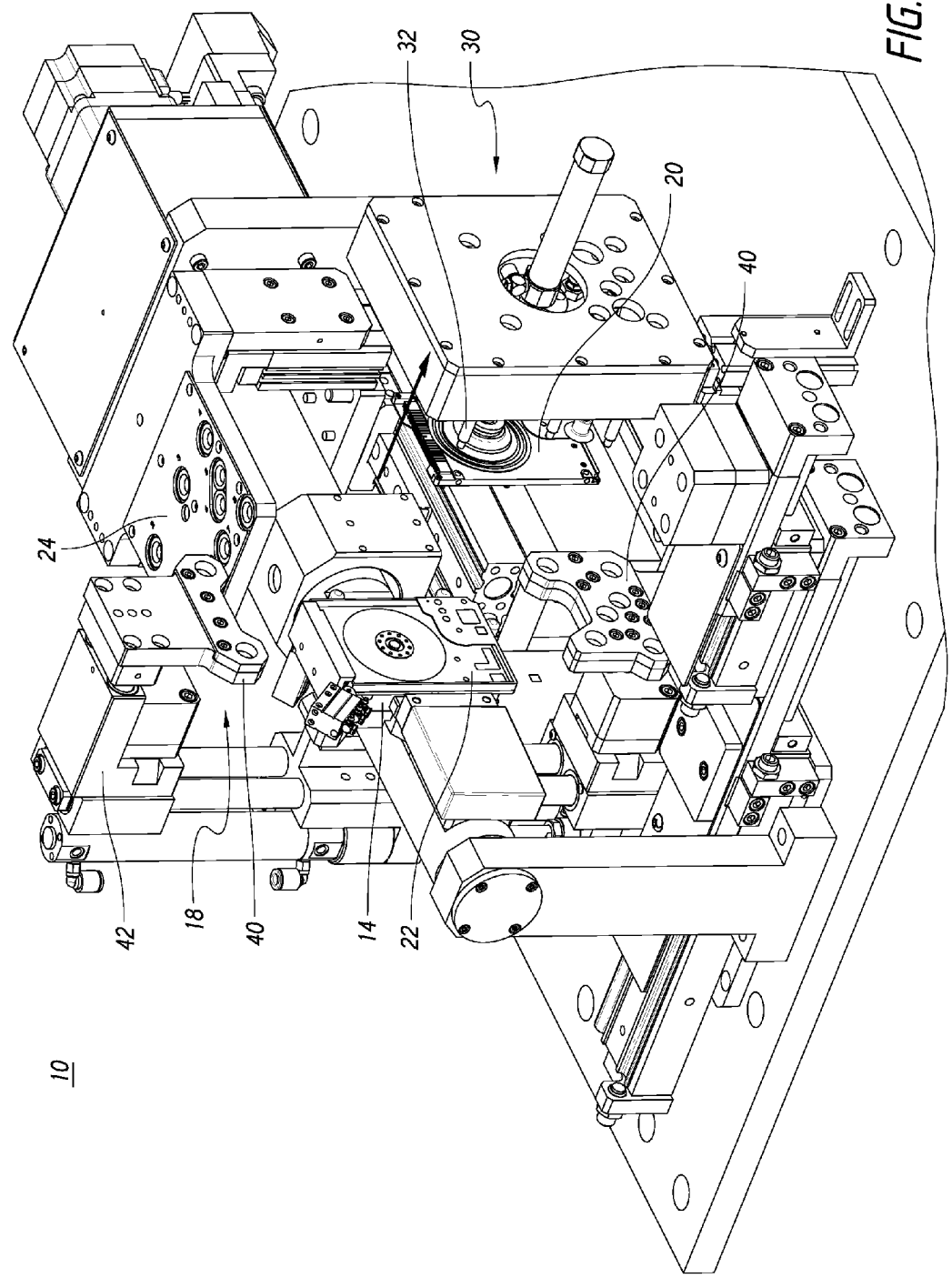
FIG. 11 illustrates a perspective view of a hard disk drive top cover removal tool in which a purge and vacuum assembly removes a top cover, in accordance with various aspects of the subject technology.

After top cover 20 is released, top cover 20 is removed from hard drive body 22, according to step S214 of FIG. 2. FIG. 11 illustrates a perspective view of hard disk drive top cover removal tool 10 in which purge and vacuum assembly 30 removes top cover 20, in accordance with various aspects of the subject technology. In some aspects, top cover 20 is removed from hard drive body 22 when gripper 36 grips top cover 20, and purge and vacuum assembly 30 slides away from nest assembly 14, thereby removing the gripped top cover 20 from hard drive body 22.

Figure 12:
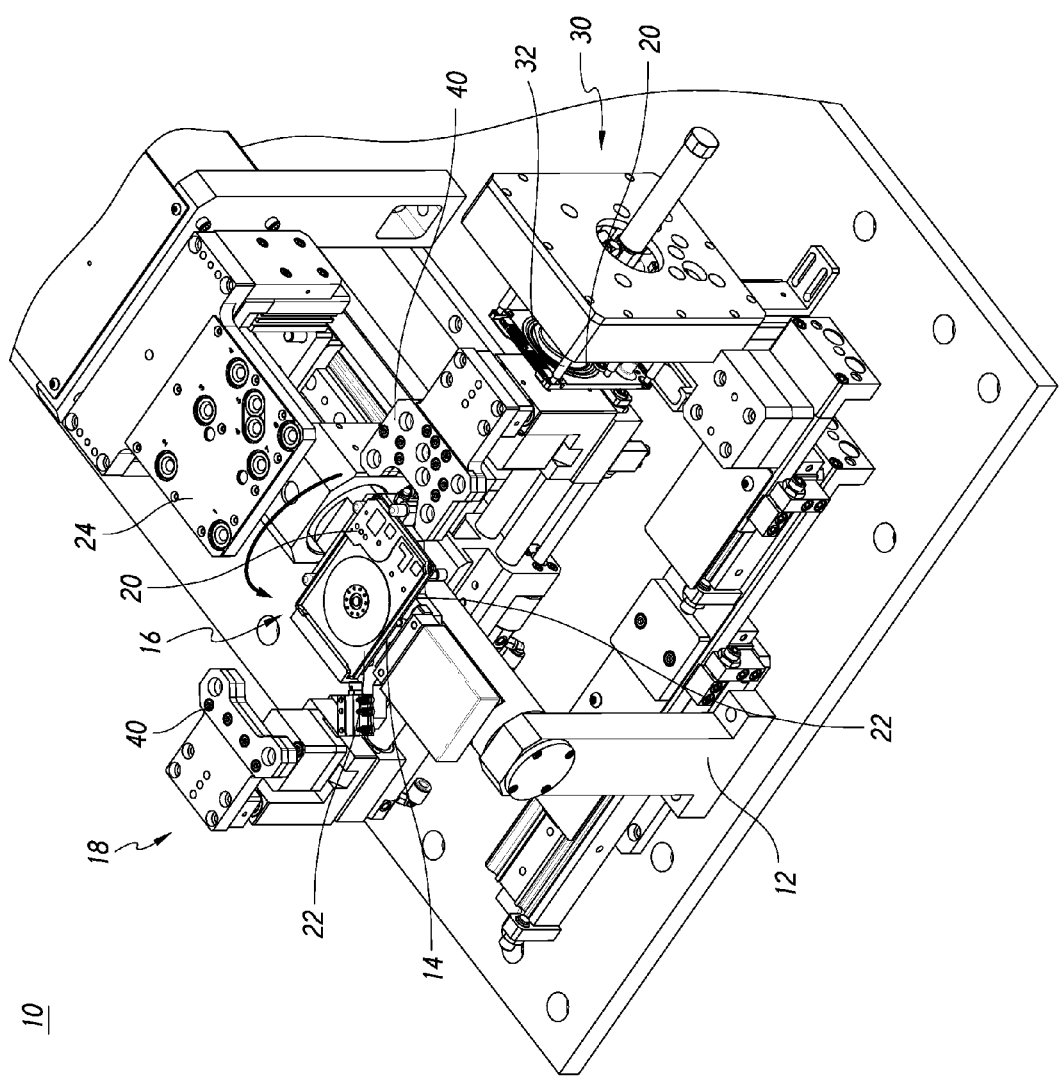
FIG. 12 illustrates a perspective view of a hard disk drive top cover removal tool in which a nest assembly rotates a hard drive body to a first position, in accordance with various aspects of the subject technology.

Once top cover 20 is removed, nest assembly 14 may rotate hard drive body 22 back to the first position. FIG. 12 illustrates a perspective view of hard disk drive top cover removal tool 10 in which nest assembly 14 rotates hard drive body 22 to the first position, in accordance with various aspects of the subject technology. In some aspects, by implementing method 200, top cover 20 can be removed and particles 46 can be prevented from contaminating the media of hard disk drive 16.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A hard disk drive top cover removal tool comprising:
   a main body;
   a nest assembly rotatably attached to the main body and configured to secure a hard disk drive, the nest assembly configured to rotate the secured hard disk drive from a first position to a second position;
   a clamp coupled to the nest assembly and configured to press against a top cover of the secured hard disk drive such that the top cover maintains contact with a hard drive body of the hard disk drive;
   a guide plate configured to be positioned with respect to the pressed top cover of the hard disk drive secured in the nest assembly such that a hole defined in the guide plate is aligned with a screw location of the top cover and the hard drive body, the hole configured to receive a screw driver for removing a screw fastening the top cover to the hard drive body at the screw location; and
   a purge and vacuum assembly configured to purge and evacuate particles from the screw location of the pressed top cover and the hard drive body of the hard disk drive in the second position, wherein the clamp is further configured to release the top cover, and wherein the purge and vacuum assembly is further configured to remove the released top cover from the hard drive body.

2. The hard disk drive top cover removal tool of claim 1, wherein the purge and vacuum assembly is slidably mounted on the main body, wherein the purge and vacuum assembly is configured to slide toward the nest assembly to engage the top cover, and wherein the purge and vacuum assembly comprises:
- a vacuum tube configured to encapsulate the screw location when the purge and vacuum assembly engages the top cover;
- an air purge nozzle extending into the vacuum tube, wherein the purge and vacuum assembly is configured to dislodge the particles when pulses of compressed gas are applied to the screw location by a compressed gas source via the air purge nozzle and to evacuate the particles from the vacuum tube when a vacuum is applied to the vacuum tube by a vacuum source; and
- a gripper configured to grip the top cover, wherein the top cover is removed from the hard drive body when the gripper grips the top cover and the purge and vacuum assembly slides away from the nest assembly.

3. The hard disk drive top cover removal tool of claim 2, wherein the gripper comprises a suction cup configured to apply suction to the top cover for gripping the top cover.

4. The hard disk drive top cover removal tool of claim 1, wherein the guide plate is slidably mounted on the main body, wherein the guide plate is configured to slide toward the nest assembly to be positioned with respect to the pressed top cover of the hard disk drive in the first position such that the hole is aligned with the screw location.

5. The hard disk drive top cover removal tool of claim 1, further comprising the screw driver.

6. The hard disk drive top cover removal tool of claim 1, wherein the first position is perpendicular to the second position.

7. The hard disk drive top cover removal tool of claim 1, wherein the nest assembly is configured to rotate the secured hard disk drive up to 90 degrees from the first position to the second position.

8. The hard disk drive top cover removal tool of claim 1, wherein the nest assembly comprises a datum feature configured to engage the hard disk drive for positioning the hard disk drive in the nest assembly.

9. The hard disk drive top cover removal tool of claim 1, wherein the clamp comprises:
- a clamp body coupled to the nest assembly;
- a bracket attached to the clamp body and configured to press against the top cover; and
- an actuator coupled to the bracket and configured to move the bracket from a first configuration to a second configuration and from the second configuration to the first configuration, wherein the bracket is not engaged with the top cover in the first configuration, and wherein the bracket presses against the top cover in the second configuration.

10. The hard disk drive top cover removal tool of claim 9, wherein the actuator is configured to move the bracket from the second configuration to the first configuration when the hard disk drive is in the second position for releasing the top cover.

11. The hard disk drive top cover removal tool of claim 1, wherein the main body comprises a shaft, wherein the nest assembly is mounted on the shaft, and wherein a motor is configured to rotate the shaft to rotate the hard disk drive secured in the nest assembly from the first position to the second position.

12. A hard disk drive top cover removal tool comprising:
- a main body;
- a nest assembly rotatably attached to the main body and configured to secure a hard disk drive, the nest assembly configured to rotate the secured hard disk drive from a first position to a second position, the first position being perpendicular to the second position;
- a clamp coupled to the nest assembly and configured to press against a top cover of the secured hard disk drive such that the top cover maintains contact with a hard drive body of the hard disk drive;
- a guide plate slidably mounted on the main body, wherein the guide plate is configured to slide toward the nest assembly to be positioned with respect to the pressed top cover of the hard disk drive in the first position such that a hole defined in the guide plate is aligned with a screw location of the top cover and the hard drive body, the hole configured to receive a screw driver for removing a screw fastening the top cover to the hard drive body at the screw location; and
- a purge and vacuum assembly slidably mounted on the main body and configured to slide toward the nest assembly to engage the pressed top cover of the hard disk drive in the second position, and to purge and evacuate particles from the screw location of the pressed top cover and the hard drive body of the hard disk drive in the second position, wherein the clamp is further configured to release the top cover, and wherein the purge and vacuum assembly is further configured to grip the top cover and to slide away from the nest assembly to remove the released and gripped top cover from the hard drive body.

* * * * *